US008735761B2

(12) United States Patent
Theurer et al.

(10) Patent No.: US 8,735,761 B2
(45) Date of Patent: May 27, 2014

(54) WELDING UNIT FOR WELDING RAILS OF A TRACK

(75) Inventors: Josef Theurer, Vienna (AT); Bernhard Lichtberger, Pregarten (AT); Heinz Mühlleitner, St. Pölten (AT)

(73) Assignee: Franz Plasser Bahnbaumaschinen-Industriegesellschaft mbH, Vienna (AT)

( * ) Notice: Subject to any disclaimer, the term of this patent is extended or adjusted under 35 U.S.C. 154(b) by 324 days.

(21) Appl. No.: 13/020,971

(22) Filed: Feb. 4, 2011

(65) Prior Publication Data
US 2011/0168675 A1 Jul. 14, 2011

Related U.S. Application Data

(63) Continuation of application No. PCT/EP2009/004972, filed on Jul. 9, 2009.

(30) Foreign Application Priority Data

Aug. 4, 2008 (AT) .................. A 1207/2008

(51) Int. Cl.
*E01B 11/44* (2006.01)
*E01B 31/18* (2006.01)
*H05B 1/00* (2006.01)

(52) U.S. Cl.
USPC ............................................. 219/53; 104/15

(58) Field of Classification Search
USPC ......... 219/53, 101, 161, 54, 55, 158, 97, 611, 219/100; 269/43, 87, 152–156, 290, 288, 269/238, 164; 104/15, 138.2; 254/43, 44; 105/31; 228/49
See application file for complete search history.

(56) References Cited

U.S. PATENT DOCUMENTS

| | | | | |
|---|---|---|---|---|
| 1,433,600 A | * | 10/1922 | Brown et al. | 219/161 |
| 3,349,216 A | | 10/1967 | Paton et al. | |
| 3,644,695 A | * | 2/1972 | Shuey et al. | 219/611 |
| 4,753,424 A | * | 6/1988 | Sato et al. | 269/43 |
| 5,270,514 A | * | 12/1993 | Wechselberger et al. | 219/100 |
| 5,389,760 A | * | 2/1995 | Zollinger | 219/53 |
| 6,779,944 B2 | * | 8/2004 | Schnorrer | 403/374.2 |

FOREIGN PATENT DOCUMENTS

| | | |
|---|---|---|
| EP | 0 132 227 B1 | 12/1986 |
| GB | 2 185 703 | 7/1987 |

OTHER PUBLICATIONS

International Search Report of PCT/EP2009/004972, Dated Oct. 12, 2009.

* cited by examiner

*Primary Examiner* — Henry Yuen
*Assistant Examiner* — Michael LaFlame, Jr.
(74) *Attorney, Agent, or Firm* — Laurence A. Greenberg; Werner H. Stemer; Ralph E. Locher

(57) ABSTRACT

A welding unit for welding rails of a track includes two unit bodies that can be moved in relation to each other by displacement cylinders along unit guides running parallel to the rails. The displacement cylinders are connected both to pull rods and to a crossbeam. Thus a simple design having high tensile forces is possible.

5 Claims, 3 Drawing Sheets

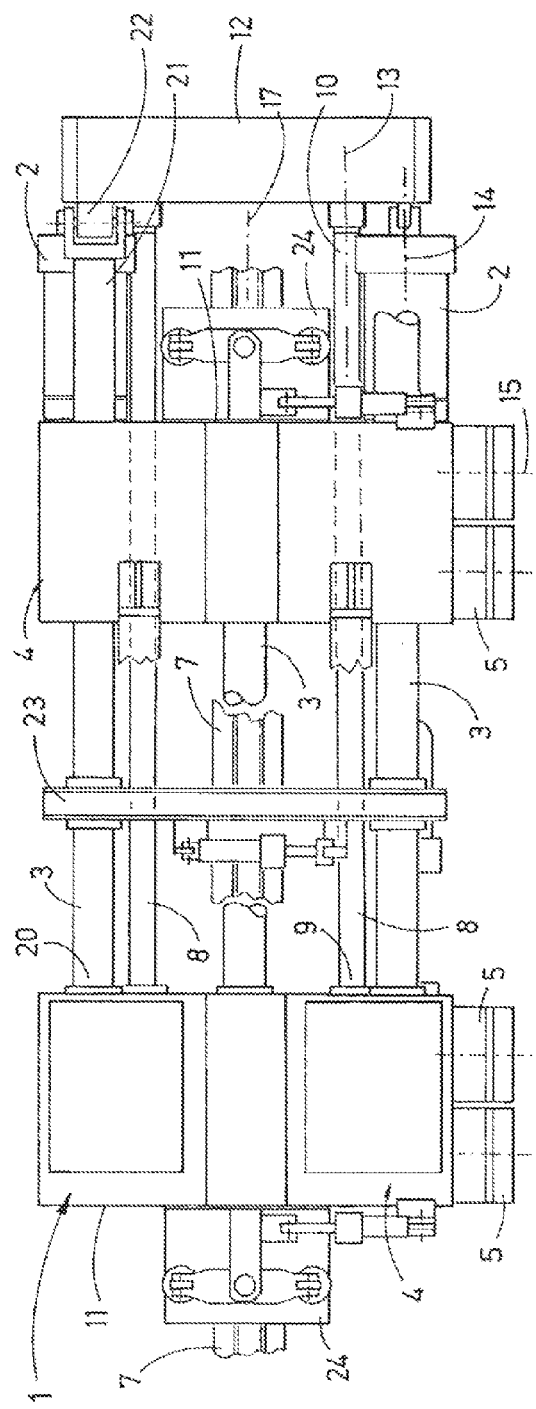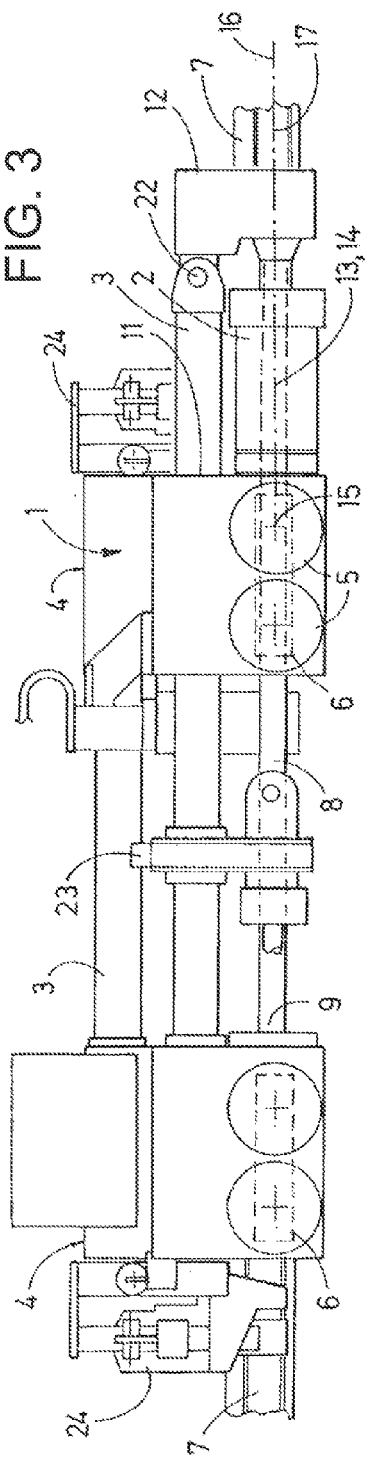

WELDING UNIT FOR WELDING RAILS OF A TRACK

CROSS-REFERENCE TO RELATED APPLICATION

This application is a continuation, under 35 U.S.C. §120, of copending international application No. PCT/EP2009/004972, filed Jul. 9, 2009, which designated the United States; this application also claims the priority, under 35 U.S.C. §119, of Austrian patent application No. A 1207/2008, filed Aug. 4, 2008; the prior applications are herewith incorporated by reference in their entirety.

BACKGROUND OF THE INVENTION

Field of the Invention

The invention relates to a welding unit for welding rails of a track. The unit includes a first and a second unit body, each connected to a clamping drive, which are movable towards one another by way of displacement cylinders along guides extending parallel to the rails.

Welding units of the generic type for so-called mobile flash-butt welding have already been disclosed in various embodiments in a multitude of publications, such as, for example, U.S. Pat. No. 3,349,216 and British published patent application GB 2 185 703 A.

A further welding unit is described in European patent EP 0 132 227 B1. There, the two unit bodies are connected to one another by way of a toggle lever.

The displacement cylinders are connected to a crossbeam on which clamping drives for gripping the rail are provided.

SUMMARY OF THE INVENTION

It is accordingly an object of the invention to provide a welding unit that overcomes the above-mentioned disadvantages of the heretofore-known devices and methods of this general type and which provides for a welding unit that is structurally simple, yet able to transfer onto the rail especially strong pulling forces directed in the longitudinal direction of the rail.

With the foregoing and other objects in view there is provided, in accordance with the invention, a welding unit for welding rails of a track, comprising:
  a clamping drive;
  a first unit body and a second unit body, each connected to said clamping drive and movably disposed relative to one another;
  displacement cylinders for moving said first and second unit bodies towards one another along guides extending parallel to the rails of the track;
  a crossbeam connected to said guides and said clamping cylinders; and
  pull rods extending parallel to said guides;
  wherein longitudinal axes of said pull rods, longitudinal axes of said displacement cylinders, and longitudinal axes of said clamping drives are located in a common plane.

By positioning the displacement cylinders in this way, the welding unit can be formed with minimal structural height. This enables a cantilevered suspension on a rail vehicle without thereby impeding the view of the track as prescribed by UIC. Furthermore, it is possible due to this embodiment to pull the rail closer by extending the piston rod out from the displacement cylinder. Thus, the piston surface is not reduced by the piston rod and is available to the full extent for the pressure build-up. Further, the displacement cylinders can have a relatively small diameter while still maintaining strong pulling forces. This results in the advantage that the rail ends to be welded need only be lifted slightly from the sleepers, thus facilitating a flush alignment of the rail ends.

In accordance with an added feature of the invention, the common plane is disposed in a neutral axis of the rails to be welded.

In accordance with an additional feature of the invention, the longitudinal axes of the clamping drives arranged on each unit body are positioned in the common plane and in a position extending perpendicularly to the longitudinal axes of said pull rods. In this embodiment, the clamping drive has a piston rod and an opening formed therein for passage of the pull rod.

In accordance with a concomitant feature of the invention, there is provided an articulated connection connecting each guide to the crossbeam.

Other features which are considered as characteristic for the invention are set forth in the appended claims.

Although the invention is illustrated and described herein as embodied in a welding unit for welding rails of a track, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 2 is a top view of the welding unit of FIG. 1;

FIG. 3 is a corresponding side elevation view thereof; and

DETAILED DESCRIPTION OF THE INVENTION

Figure 1:
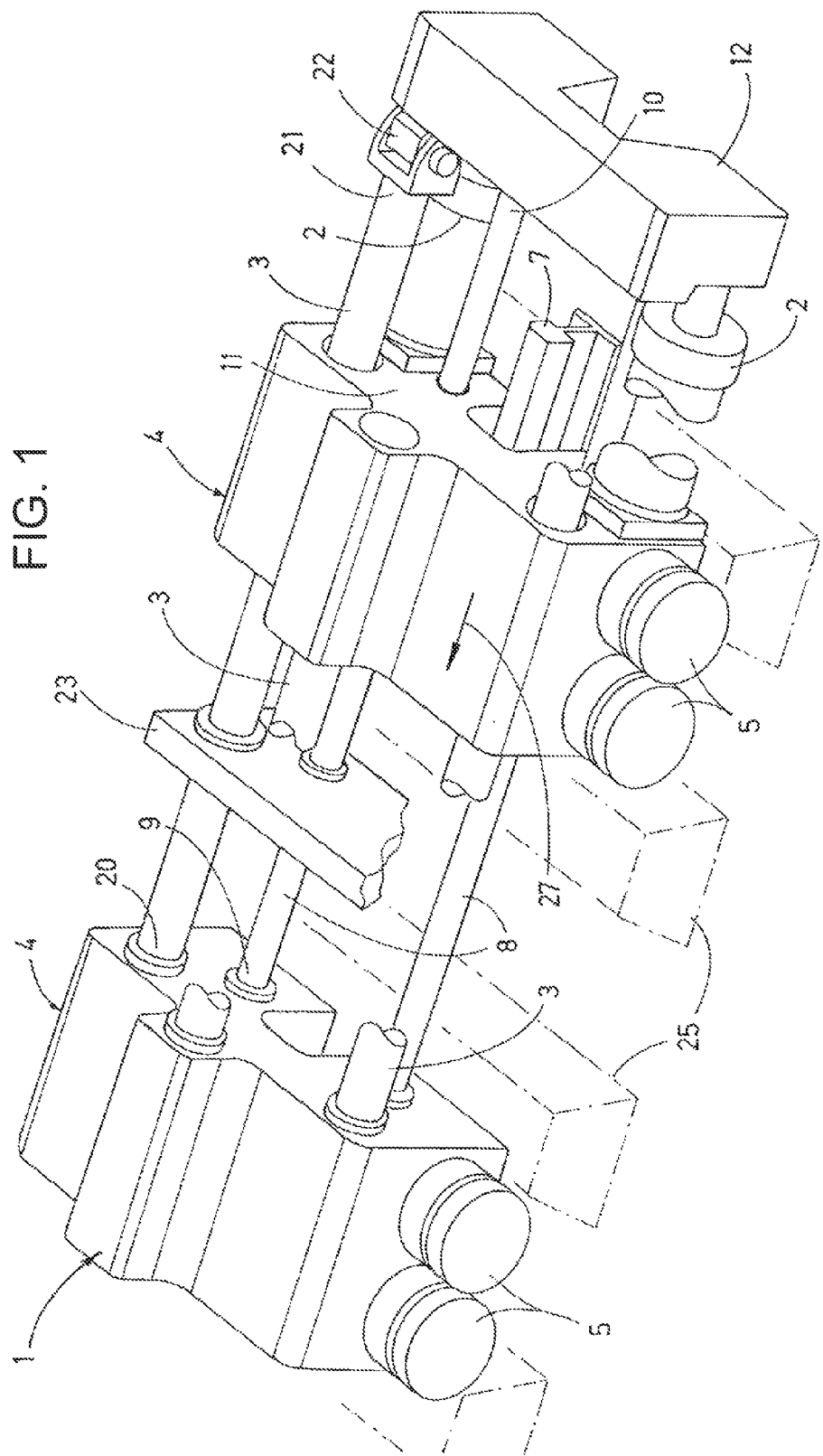
FIG. 1 is a perspective view of a welding unit according to the invention in which, for the sake of clarity, only the most important components are illustrated.

Referring now to the figures of the drawing in detail and first, particularly, to FIGS. 1 to 3 thereof, there is shown a welding unit 1, composed of two unit bodies 4 which are displaceable towards one another along guides 3 with the aid of displacement cylinders 2. The unit bodies 4 are connected in each case to two clamping drives 5 by means of which clamping jaws 6 are pressed against rails 7 to be welded to one another.

Pull rods 8 or tie rods 8, extending parallel to the guides 3, have a first end 9 fastened to the first unit body 4 and are guided through the second unit body 4, wherein a respective second end 10 is positioned to protrude with regard to an exterior surface 11, extending perpendicularly to the guides 3, of the second unit body 4.

The second ends 10 of the two pull rods 8 are connected to a crossbeam 12. Each displacement cylinder 2 is fastened, on the one hand, to the said exterior surface 11 of the second unit body 4 and, on the other hand, to the crossbeam 12.

As visible particularly in FIG. 3, longitudinal axes 13, 14, 15 of the pull rods 8, of the displacement cylinders 2 and of the clamping drives 5 are positioned in a common plane 16. The latter is situated in a neutral axis 17 of the rail 7.

Figure 4:
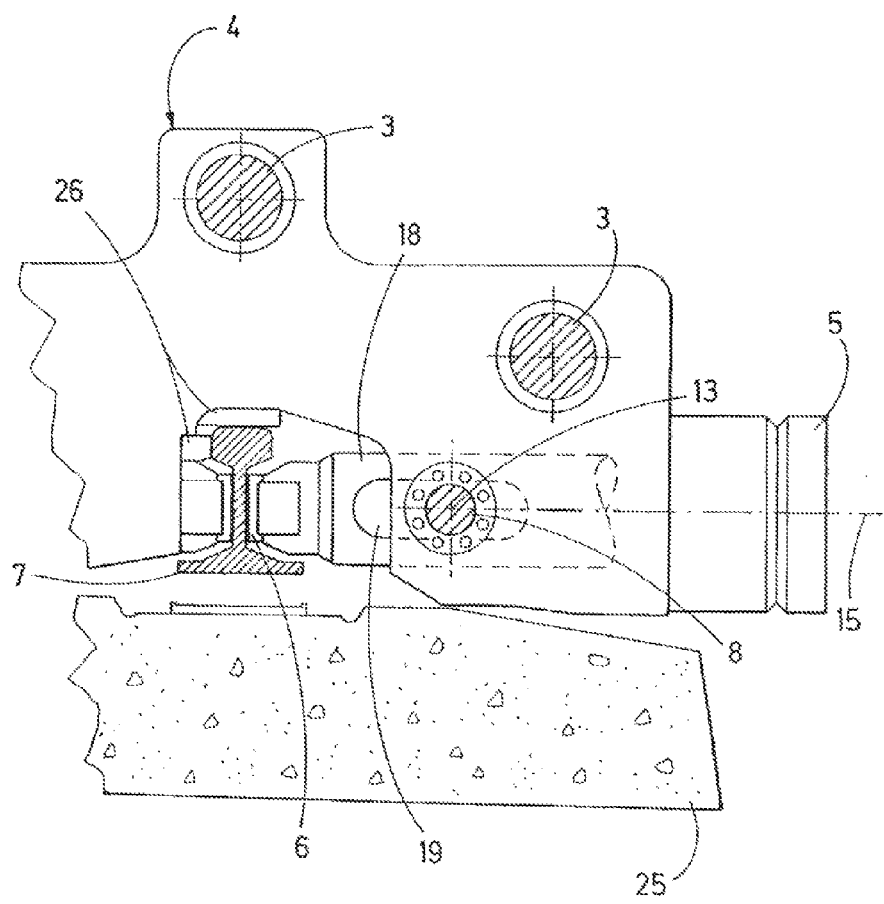
FIG. 4 is a partial section view of a unit body looking in the longitudinal direction of the rail.

As shown in FIG. 4, each of the clamping drives 5—extending perpendicularly to the longitudinal axis 13 of the pull rods 8—is equipped, in the region of piston rods 18, with an opening 19 for the passage of the pull rod 8. The guides 3, having a first end 20 connected to the first unit body 4, have a second end 21 connected in each case to the crossbeam 12 by way of an articulated connection 22.

A shearing device 23 for removing a welding seam is provided between the two unit bodies 4. Fastened to each exterior surface 11 of the two unit bodies 4 is a lifting device 24 for lifting the rails 7.

In preparation of the welding procedure, the two rails 7 are lifted from the sleepers 25, lying thereunder, by way of the lifting devices 24 (the rails are lifted in FIG. 4) and pressed against stop bars 26. Subsequently, the clamping drives 5 are actuated in order to press the clamping jaws 6 against a rail web of the rail 7 with a clamping force of 350 tons. Additionally, non-illustrated electrodes are pressed against the rails 7.

To initiate the welding procedure, the second unit body 4 together with the gripped rail 7 is moved, by actuation of the displacement drives 2, with a pulling force of up to 150 tons in a direction 27 towards the second rail 7. As soon as the spacing of the two rail ends as required for the welding has been achieved, the supply of electrical current is started.

In case the ambient temperature lies above the neutral temperature, it is also possible, if desired, to move the rail 7—by corresponding actuation of the two displacement drives 2—in a direction opposite to the indicated direction 28.

The invention claimed is:

1. A welding unit for welding rails of a track, comprising:
a first unit body and a second unit body, each connected to a respective clamping drive and movably disposed relative to one another;
displacement cylinders configured to move said first and second unit bodies towards one another along guides extending parallel to the rails of the track;
a crossbeam connected to said guides and said displacement cylinders; and
pull rods extending parallel to said guides and having ends connected to said crossbeam;
wherein longitudinal axes of said pull rods, longitudinal axes of said displacement cylinders, and longitudinal axes of said clamping drives are located in a common plane.

2. The welding unit according to claim 1, wherein said common plane is disposed in a neutral axis of the rails to be welded.

3. The welding unit according to claim 1, wherein said longitudinal axes of said clamping drives arranged on each said unit body are positioned in said common plane and in a position extending perpendicularly to said longitudinal axes of said pull rods, and wherein said clamping drive has a piston rod and an opening formed therein for passage of a respective said pull rod.

4. The welding unit according to claim 1, which comprises an articulated connection connecting each guide to said crossbeam.

5. The welding unit according to claim 1, wherein said clamping drives are clamping drives with piston rods extending in the longitudinal axis.

* * * * *